United States Patent
Geng et al.

(10) Patent No.: US 9,817,484 B2
(45) Date of Patent: Nov. 14, 2017

(54) METHOD FOR CAPTURING SCREEN CONTENT OF MOBILE TERMINAL AND DEVICE THEREOF

(71) Applicant: Smartisan Technology Co. Ltd., Beijing (CN)

(72) Inventors: Dawei Geng, Beijing (CN); Xiaomu Zhu, Beijing (CN)

(73) Assignee: SMARTISAN TECHNOLOGY CO., LTD., Beijing (CN)

(*) Notice: Subject to any disclaimer, the term of this patent is extended or adjusted under 35 U.S.C. 154(b) by 235 days.

(21) Appl. No.: 14/607,458

(22) Filed: Jan. 28, 2015

(65) Prior Publication Data
US 2016/0216797 A1    Jul. 28, 2016

(51) Int. Cl.
| G06F 3/023 | (2006.01) |
|---|---|
| G06F 3/0484 | (2013.01) |
| G06F 3/0488 | (2013.01) |
| G06F 17/21 | (2006.01) |

(52) U.S. Cl.
CPC ............ *G06F 3/023* (2013.01); *G06F 3/0484* (2013.01); *G06F 3/04883* (2013.01); *G06F 17/218* (2013.01)

(58) Field of Classification Search
CPC ............ G06F 3/04845; G06F 3/04842; G06F 3/04886; G06F 2203/04803; G06F 2203/04808; G06F 3/0412
See application file for complete search history.

(56) References Cited

U.S. PATENT DOCUMENTS

| 2014/0370937 A1* | 12/2014 | Park ................. H04M 1/72519 455/566 |
| 2015/0277571 A1* | 10/2015 | Landau ............... G06F 3/04842 715/863 |
| 2015/0317064 A1* | 11/2015 | Zhu ..................... G06F 3/0488 345/643 |

FOREIGN PATENT DOCUMENTS

| CN | 102779027 A | 11/2012 |
| CN | 103037102 A | 4/2013 |
| CN | 103135914 A | 6/2013 |
| CN | 103218135 A | 7/2013 |

OTHER PUBLICATIONS

Chinese Office Action dated Jan. 27, 2016 from corresponding Chinese Patent Application No. 201310535860.0, 9 pages.

* cited by examiner

*Primary Examiner* — Viet Pham
(74) *Attorney, Agent, or Firm* — Ohlandt, Greeley, Ruggiero & Perle, LLP

(57) ABSTRACT

A method for capturing screen content of a mobile terminal and a device thereof are provided. The method comprises: detecting a DOWN event of a specified key of the mobile terminal and recording the time of occurrence of the DOWN event as a first time stamp; detecting an UP event of the specified key and recording the time of occurrence of the UP event as a second time stamp; and comparing a difference between the second time stamp and the first time stamp with a preset time threshold, performing a full screen capturing or a regional screen capturing on the screen content of the mobile terminal if the difference is less than the preset time threshold, or performing a regional screen capturing or a full screen capturing on the screen content of the mobile terminal if the difference is greater than the preset time threshold.

12 Claims, 3 Drawing Sheets

METHOD FOR CAPTURING SCREEN CONTENT OF MOBILE TERMINAL AND DEVICE THEREOF

TECHNICAL FIELD

The disclosure relates to the field of information processing technologies, and in particular to a method for capturing screen content of a mobile terminal and a device thereof.

BACKGROUND

With the rapid development of mobile technologies, the mobile terminal is not limited to only meet the people's elementary needs such as a voice calling, sending and receiving text messages, but expands the functionality gradually to various multimedia applications. For example, the mobile terminal is used to record an audio or video, play a video, acquire network news, read e-books, and provide amusement games. In the process of integrating and perfecting mobile terminal's functions, a new functional need, i.e., a function for capturing screen content of the mobile terminal, arises. The screen capturing technology may be used to capture the content presented on the screen of the mobile terminal and save the captured content to a preset location depending on interests and needs of people. For example, a user of the mobile terminal, when viewing an online video, is interested in a picture in the video and hopes to capture the picture and save the picture locally. In another example, the user of the mobile terminal finds a commodity of interest on an online shopping website, does not intend to buy it now but hopes to save information of the commodity locally. Such practical needs bring the application of the screen capturing technology in the mobile terminals. However, the conventional screen capturing technologies such as QQ screen capturing, 263 screen capturing, full screen capturing via the Printscreen key on the keyboard of the computer, are mainly applied to devices other than mobile terminals. Even though there are some screen capturing technologies applied to the mobile terminals, these screen capturing technologies are defective and has poor maneuverability. In summary, there is no satisfactory method applicable in the mobile terminal for capturing the screen content of the mobile terminal.

SUMMARY

To solve the above problems, a method for capturing screen content of a mobile terminal and a device thereof are provided according to embodiments of the disclosure, whereby the mobile terminal can perform a full screen capturing operation and/or a regional screen capturing operation on the screen content of the mobile terminal and the practical needs are met.

A method for capturing screen content of a mobile terminal is provided according to an embodiment of the disclosure. The method includes:

detecting a DOWN event of a specified key of the mobile terminal, and recording the time of occurrence of the DOWN event as a first time stamp when the occurrence of the DOWN event of the specified key of the mobile terminal is detected;

detecting an UP event of the specified key of the mobile terminal, and recording the time of occurrence of the UP event as a second time stamp when the occurrence of the UP event of the specified key of the mobile terminal is detected; and comparing a difference between the second time stamp and the first time stamp with a preset time threshold, performing a full screen capturing operation or a regional screen capturing operation on the screen content of the mobile terminal in the case that the difference is less than the preset time threshold, or performing a regional screen capturing operation or a full screen capturing operation on the screen content of the mobile terminal in the case that the difference is greater than the preset time threshold, wherein the full screen capturing operation is used to capture all of the screen content of the mobile terminal to obtain a full screen shot, and the regional screen capturing operation is used to capture a selected region of the screen content of the mobile terminal to obtain a regional screen shot.

Preferably, the process of performing a full screen capturing operation on the screen content of the mobile terminal may include:

acquiring a real-scale interface of a screen of the mobile terminal, wherein the real-scale interface refers to a maximum physical screen present by the mobile terminal; and scaling the real-scale interface down and determining the scaled-down full screen shot containing the screen content of the mobile terminal as a final full screen shot.

Further preferably, an operating system installed on the mobile terminal may be an android system, the process of acquiring a real-scale interface of a screen of the mobile terminal may include calling a surface screenshot function in the android system to acquire a bitmap for the real-scale interface of the screen of the mobile terminal; and the process of scaling the real-scale interface down and determining the scaled-down full screen shot containing the screen content of the mobile terminal as a final full screen shot may include calling an animator set function in the android system to scale the bitmap down and adding a view, which loads the scaled-down bitmap, into a current window, wherein the bitmap presented in the window is the final full screen shot.

Further preferably, the full screen capturing operation performed on the screen content of the mobile terminal may be accomplished by a first service component in a systemUI application.

Preferably, the process of performing a regional screen capturing operation on the screen content of the mobile terminal may include:

receiving the selected region in a local portion on a screen of the mobile terminal; and drawing a layer of the selected region, wherein a transparency of the drawn layer of the selected region is different from a transparency of other region except the selected region on the screen of the mobile terminal; and determining the screen content corresponding to the layer of the selected region as a final regional screen shot.

Preferably, an operating system installed on the mobile terminal may be an android system, the process of receiving the selected region in a local portion on a screen of the mobile terminal may include: receiving a TOUCH event on a rectangular box for indicating the selected region, calling a scalegesturedetectoron function to detect a change of the rectangular box, and calling, in the case that the rectangular box does not move, a smartisanscalelistener function which is a callback function to calculate the selected region where the rectangular box locates; and the process of drawing a layer of the selected region may include calling an invalidate function for a view to draw the layer of the selected region.

Further preferably, the regional screen capturing operation performed on the screen content of the mobile terminal may be accomplished by a second service component in a systemUI application.

Preferably, the method may further include: presenting a control bar with a trigger point for full screen capturing function and a trigger point for regional screen capturing function on the screen of the mobile terminal, in the case that the difference between the second time stamp and the first time stamp is compared with the preset time threshold and is less than or greater than the preset time threshold, and performing the regional screen capturing operation or the full screen capturing operation on the screen content of the mobile terminal according to the selection of the trigger point for regional screen capturing function or the trigger point for full screen capturing function on the control bar.

Further preferably, the specified key of the mobile terminal may be one real key or one function key, or a combination of two real keys, a combination of two function keys or a combination of one real key and one function key of the mobile terminal.

Further preferably, the combination of two real keys may be a combination of a power key and a reset key.

A device for capturing screen content of a mobile terminal is further provided according to an embodiment of the disclosure, which includes: a first detecting unit, a first recording unit, a second detecting unit, a second recording unit, a time stamp comparing unit, and a full screen capturing unit or a regional screen capturing unit, wherein the first detecting unit is configured to detect a DOWN event of a specified key of the mobile terminal;

the first recording unit is configured to record the time of occurrence of the DOWN event as a first time stamp when the occurrence of the DOWN event of the specified key of the mobile terminal is detected;

the second detecting unit is configured to detect an UP event of the specified key of the mobile terminal;

the second recording unit is configured to record the time of occurrence of the UP event as a second time stamp when the occurrence of the UP event of the specified key of the mobile terminal is detected;

the time stamp comparing unit is configured to compare a difference between the second time stamp and the first time stamp with a preset time threshold, wherein the full screen capturing unit or the regional screen capturing unit is triggered in the case that the difference is less than the preset time threshold, or the regional screen capturing unit or the full screen capturing unit is triggered in the case that the difference is greater than the preset time threshold;

the full screen capturing unit is configured to perform a full screen capturing operation on the screen content of the mobile terminal, and the full screen capturing operation is used to capture all of the screen content of the mobile terminal to obtain a full screen shot; and the regional screen capturing unit is configured to perform a regional screen capturing operation on the screen content of the mobile terminal, and the regional screen capturing operation is used to capture a selected region of the screen content of the mobile terminal to obtain a regional screen shot.

Preferably, the full screen capturing unit may include an interface acquiring sub-unit and an interface processing sub-unit, wherein the interface acquiring sub-unit may be configured to acquire a real-scale interface of a screen of the mobile terminal, wherein the real-scale interface refers to a maximum physical screen present by the mobile terminal; and the interface processing sub-unit may be configured to scale the real-scale interface down, wherein the scaled-down full screen shot containing the screen content of the mobile terminal is determined as a final full screen shot.

Preferably, the regional screen capturing unit may include a region receiving sub-unit and a layer drawing sub-unit, wherein the region receiving sub-unit may be configured to receive the selected region in a local portion on a screen of the mobile terminal; and the layer drawing sub-unit may be configured to draw a layer of the selected region, wherein a transparency of the drawn layer of the selected region is different from a transparency of other region except the selected region on the screen of the mobile terminal, and the screen content corresponding to the layer of the selected region is determined as a final regional screen shot.

Preferably, the device may further include a control bar presenting unit, configured to present a control bar with a trigger point for full screen capturing function and a trigger point for regional screen capturing function on the screen of the mobile terminal in the case that the difference between the second time stamp and the first time stamp is less than or greater than the preset time threshold, where the regional screen capturing unit performs the regional screen capturing operation or the full screen capturing unit performs the full screen capturing operation on the screen content of the mobile terminal according to the selection of the trigger point for full screen capturing function or the trigger point for regional screen capturing function on the control bar.

According to the embodiments of the disclosure, the DOWN event and UP event of the specified key are detected and the time of occurrence of the events is recorded, the difference between the time stamps for the specified key is determined, and then the full screen capturing operation or the regional screen capturing operation are performed on the screen content of the mobile terminal based on the relationship of the difference and the preset time threshold. As compared with the conventional technology, not only a screen shot can be obtained by performing a screen capturing operation on the screen content of the mobile terminal, but also different screen capturing modes (a full screen capturing and a regional screen capturing) can be switched by following preset configuration, so that the screen capturing operation meets the user's demands, thereby enhancing the user experience.

BRIEF DESCRIPTION

In order to illustrate the technical solutions according to the embodiments of the disclosure or in the conventional technology more clearly, the drawings to be used in the description of the conventional technology or the embodiments are described briefly hereinafter. Apparently, the drawings described hereinafter are only some embodiments of the present disclosure, and other drawings may be obtained by those skilled in the art according to those drawings without creative effort.

DETAILED DESCRIPTION

Hereinafter, the technical solutions in the embodiments of the present disclosure are described clearly and completely in conjunction with the drawings in the embodiments of the present disclosure. Apparently, the described embodiments are only a few of the embodiments of the present disclosure. All the other embodiments obtained by those skilled in the art based on the embodiments of the present disclosure without creative effort fall within the scope of protection of the disclosure.

Figure 1:
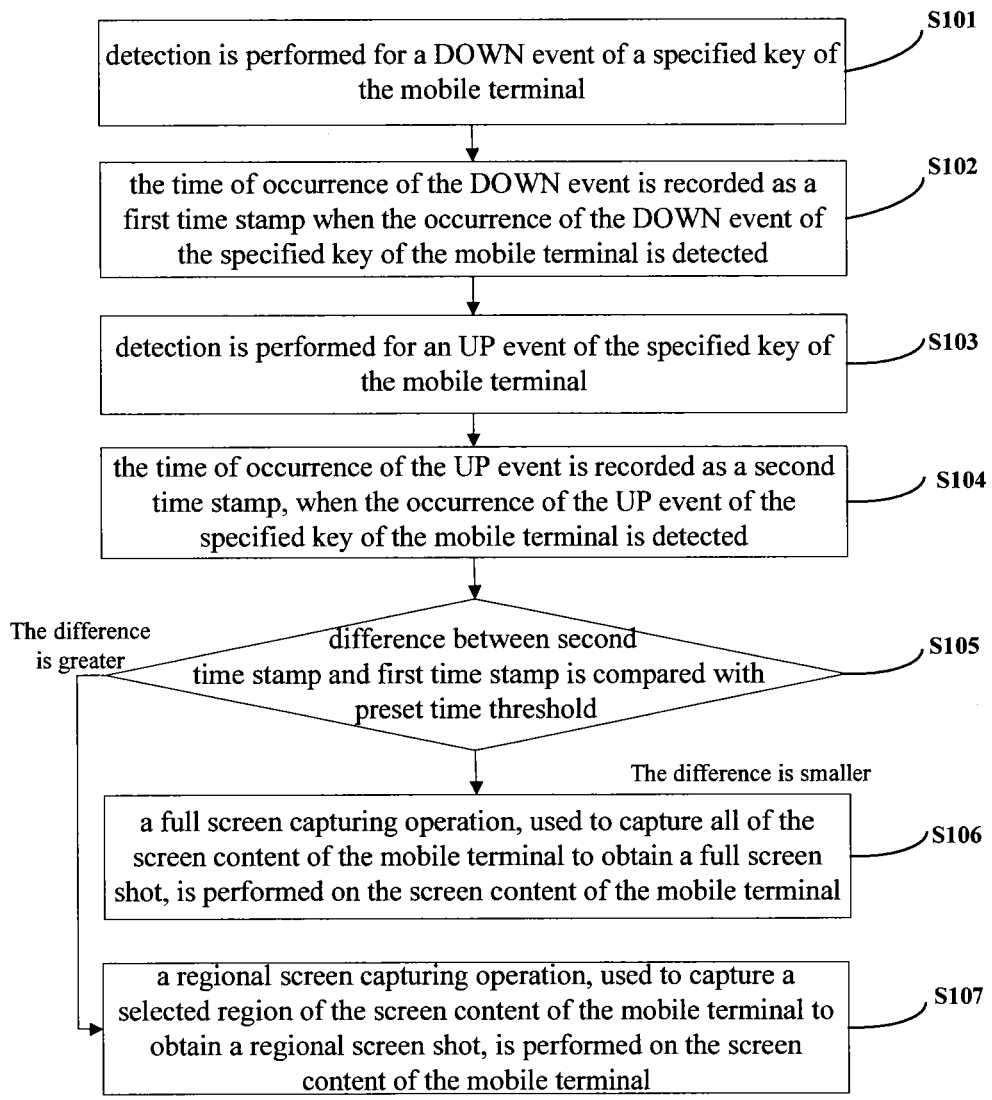
FIG. 1 is a flowchart of a method for capturing screen content of a mobile terminal according to an embodiment of the disclosure.

Reference is made to FIG. 1, which illustrates a flowchart of a method for capturing screen content of a mobile terminal according to an embodiment of the disclosure. The flowchart includes steps S101 to S107.

In step S101, detection is performed for a DOWN event of a specified key of the mobile terminal.

The mobile terminal has multiple keys, and different keys have different specific functions (the initial functions preset in the mobile terminal). For example, for a power key, long press on the power key may turn the mobile terminal off. In another example, for a HOME key, a press on the HOME key may switch the mobile terminal back to a basic state from other states. Besides real keys existing physically on the mobile terminal, function keys, which are virtual keys, are normally provided for the mobile terminal, particularly for an intelligent mobile terminal. For example, for a smartphone without a real keyboard, a virtual keyboard may be presented on the screen of the mobile terminal when a text input is required, and the keys on the virtual keyboard are virtual keys. For the purposes of the disclosure, one or more of these keys may be specified in advance as the objects to be detected regarding whether a corresponding event occurs. The specified key may be only one real key or one function key, or may be a combination of two real keys or two function keys, or may also be a combination of one real key and one function key. Certainly, a combination of more keys may be determined as the specified key herein according to the practical needs. Generally, a combination of two keys is preferable in the disclosure, such as a combination of the power key and the HOME key. The reason why the combination of two keys is preferable is that: in the case where only a single key is selected as the specified key, since a corresponding function is predefined generally for the single key, setting a new function for the single key may, in one aspect, result in confusion among the functions and inconvenience for user operation, and in the other aspect, introduce additional cost since it is technically complex to switch among different functions of the same key; in the cast where more than two keys are combined as the specified key, although it is more convenient to define a new function different from the preset functions, it is required to press multiple keys at a time when the user performs an operation, which is very inconvenient.

In step S102, the time of occurrence of the DOWN event is recorded as a first time stamp when the occurrence of the DOWN event of the specified key of the mobile terminal is detected.

In the mobile terminal, information may be exchanged using an event-driven mechanism. An event is triggered by a certain operation on the mobile terminal from the user of the mobile terminal, then a corresponding program (a function or a functional module) in the mobile terminal is triggered by the event to perform a corresponding operation, and thus the preset function is accomplished. In the embodiment, once detection with regard a certain (some) specified key(s) of the mobile terminal is started, the time of occurrence of the DOWN event is recorded when the occurrence of the DOWN event of the specified key is detected. The DOWN event and the subsequent UP event are associated with the operations on the key. Usually, there may be various operations on a certain key, such as (short-time) pressing, long pressing (durative pressing), interval pressing in succession (multiple fast clicks), and different operations may correspond to different events. In the embodiment, the occurrence of the DOWN event usually means that the specified key is pressed down; and the occurrence of the UP event usually means that the specified key is bounced up.

In step S103, detection is performed for an UP event of the specified key of the mobile terminal.

In step S104, the time of occurrence of the UP event is recorded as a second time stamp, when the occurrence of the UP event of the specified key of the mobile terminal is detected.

In step S105, a difference between the second time stamp and the first time stamp is compared with a preset time threshold. Step S106 is performed in the case that the difference is less than the preset time threshold; or step S107 is performed in the case that the difference is greater than the preset time threshold.

The time difference between the two events may be calculated after the time of occurrence of the two events for the same specified key above is recorded. The time difference can reflect the operation on the specified key. In the embodiment, a preset time threshold is set and compared with the difference between the two time stamps, and the relationship of the preset time threshold and the difference between the time stamps can be used to determine different subsequent operations accordingly: a full screen capturing operation is triggered to be performed in the case that the difference between the time stamps is less than the preset time threshold; or a regional screen capturing operation is triggered to be performed in the case that the difference between the time stamps is greater than the preset time threshold. It should be noted that the preset time threshold may be determined depending on the specific conditions, such as 5 s, 4 s.

In step S106, a full screen capturing operation, used to capture all of the screen content of the mobile terminal to obtain a full screen shot, is performed on the screen content of the mobile terminal, and the process ends.

In step S107, a regional screen capturing operation, used to capture a selected region of the screen content of the mobile terminal to obtain a regional screen shot, is performed on the screen content of the mobile terminal, and the process ends.

Based on the relationship of the preset time threshold and the difference between the time stamps, in the case that the step 106 is triggered, the full screen capturing operation is performed and the full screen shot is obtained by performing the full screen capturing operation on the screen content of the mobile terminal, and the screen shot includes all of the screen content of the mobile terminal, namely, the content within the physical display screen of the mobile terminal. This is referred to as a full screen capturing, and the full screen capturing can keep the state of the current screen to the most extent and provide a whole current picture for the user. In the case that the step 107 is triggered, the regional screen capturing operation is performed and the regional screen shot is obtained by performing the regional screen capturing operation on the screen content of the mobile terminal, and the screen shot includes a local region on the physical display screen of the mobile terminal. This is referred to as a regional screen capturing, and the regional screen capturing can meet the user's needs for a point of interest. The above two modes have different features. Although all of the content on the physical display screen can be obtained by means of the full screen capturing, the captured picture is larger in such operation, in one aspect, this puts a strain on the mobile terminal with weaker computing power as compared with a computer system, and in another aspect, more storage space is consumed when the captured picture is stored. Although the user's needs for a specific content of interest can be met and the strain on the computing and storing for the mobile terminal is alleviated by means of the regional screen capturing mode, the user often has diversified and transferable points of interest. For example, in the case that multiple points of interest are desired to be obtained in the same video picture, it is difficult to meet the needs timely and accurately. In another example, if in a period of time after a point of interest is captured, another point of interest in the video picture in which the former point of interest is located is desired to be obtained, it is difficult to obtain another point of interest since the frame the video picture is already played and thus the user's needs can not be satisfied.

According to the embodiment, the DOWN event and UP event of the specified key are detected and the time of occurrence of the events is recorded, the difference between the time stamps for the specified key is determined, and then the full screen capturing operation or the regional screen capturing operation are performed on the screen content of the mobile terminal based on the relationship of the difference and the preset time threshold. As compared with the conventional technology, not only a screen shot can be obtained by performing a screen capturing operation on the screen content of the mobile terminal, but also different screen capturing modes (a full screen capturing and a regional screen capturing) can be switched by following preset configuration, and therefore, the disadvantages for the full screen capturing mode or the regional screen capturing mode respectively are avoided, and the full screen capturing mode and the regional screen capturing mode are combined together, thus the screen capturing operation meets the user's demands, thereby enhancing the user experience.

It should be noted that, in the previous embodiment, the full screen capturing mode and the regional screen capturing mode are combined as follows: the full screen capturing operation is triggered in the case that the difference between the time stamps is less than the preset time threshold; or the regional screen capturing operation is triggered in the case that the difference between the time stamps is greater than the preset time threshold. However, the relationship of the preset time threshold and the difference between the time stamps corresponds to either the full screen capturing operation or the regional screen capturing operation, which is not limited to the foregoing case and may be determined depending on the specific conditions in practical application. For example, the regional screen capturing operation is triggered in the case that the difference between the time stamps is less than the preset time threshold; or the full screen capturing operation is triggered in the case that the difference between the time stamps is greater than the preset time threshold. It should be noted that the specified key may be one key or may be a combination of multiple keys, as previously described. In the case that the specified key is one key and the key is a power key, the usual power off operation triggered by a long press on the power key is required to be distinguished from that in the disclosure as follows. Through the long press on the power key, it is to perform detection with regard to an event and to trigger power off operation once the duration of the detected event reaches the time threshold specified in the system. In the disclosure, for the triggering of the screen capturing operation, the difference between the time stamps is calculated upon reception of the UP event of the power key, and in this case, the occurrence of the UP event may interrupt the continuity of the DOWN event, and therefore the triggering of power off by long press on the power key can be avoided.

In the foregoing embodiment, the foregoing embodiment may further be improved to obtain a better technical effect according to the practical needs. In the following, two improvements are given by way of examples. Other variations may be derived by those skilled in the art on the base of the core contents in the disclosure, and the variant embodiments fall in in the scope of protection of the disclosure.

Figure 2:
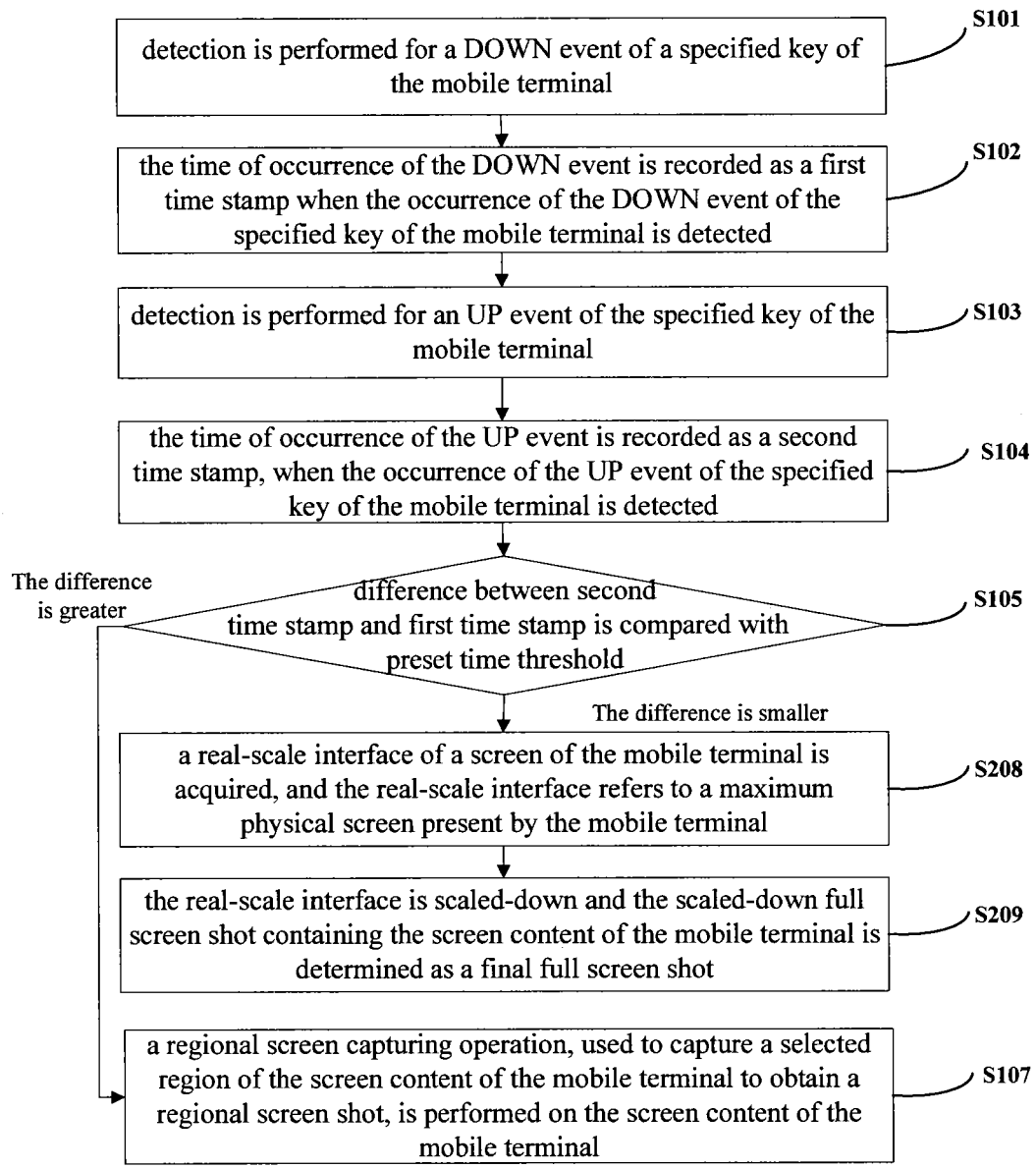
FIG. 2 is a flowchart of a method for capturing screen content of a mobile terminal according to another embodiment of the disclosure.

In a first improvement, the full screen shot is scaled. In the foregoing embodiment, the full screen shot obtained through the full screen capturing operation usually has the same size as the physical interface of the display screen of the mobile terminal. In this case, it is difficult for the user to distinguish the real interface of the display screen of the mobile terminal from the captured interface, and thus the user may consider that the full screen capturing operation fails and the user may repeat the operation, and the processing resources are wasted. To this end, referring to FIG. 2, according to another embodiment of the disclosure, the full screen capturing operation on the screen content of the mobile terminal is performed preferably in the following manner. The embodiment is different from the foregoing embodiment only in step S106, i.e., step S106 in the foregoing embodiment is further optimized, and steps S101 to S105 and step S107 are the same as that in the foregoing embodiment, therefore, the same reference numbers are used.

In step S208, a real-scale interface of a screen of the mobile terminal is acquired, and the real-scale interface refers to a maximum physical screen present by the mobile terminal.

In step S209, the real-scale interface is scaled-down and the scaled-down full screen shot containing the screen content of the mobile terminal is determined as a final full screen shot.

In this way, the real interface of the display screen of the mobile terminal may be distinguished from the captured full screen shot. The real interface is greatest and the full screen shot is presented in the greatest real interface, and the two interfaces can be distinguished readily by the user, and thus it is known whether the full screen capturing operation succeeds, and the repeated multiple operations are avoided.

If an operating system installed on the mobile terminal of the user is an android system, the above processes can be accomplished using some libraries of functions (or methods) in the android system in practice. Specifically, in the case of triggering the full screen capturing operation, the android system calls a surface.screenshot function (the function in the form of surface.screenshot (int width, int height)) to acquire a bitmap for the real-scale interface of the screen of the mobile terminal, calls an animatorset function (the function in the form of animatorset (int width, int height)) in the android system to scale the bitmap down, and adds a view loading the scaled-down bitmap into a current window, where the bitmap presented in the window is the final full screen shot.

In a second improvement, a local region is selected by the user, and the selected region is used as the region of the regional screen shot. In the foregoing embodiment, how to acquire the region of the regional screen shot is not defined. In practical application, various manners may be used. For example, the possible region of user interest is identified automatically by the mobile terminal, and the region of interest is used as the region of the regional screen shot. Generally, a certain region in the center of the screen of the mobile terminal most likely contains valuable content, and the mobile terminal may automatically take this region as the object to be captured regionally. Some conditions may be preset for the automatic identification of the region of interest, and the most possible regions of user interest may be determined by matching these conditions. Herein, the conditions may be a result obtained by statistically analyzing users' historical habits, or may be a preset specific configuration. However, no matter how intelligent the region of interest is obtained by the mobile terminal according to these conditions, the inaccurate cases may appear in practical application. For this end, preferably, the appropriate region is determined by the user. The regional screen capturing operation is performed preferably in the following manner in the disclosure.

The selected region in a local portion on a screen of the mobile terminal is received; a layer of the selected region is drawn, where a transparency of the drawn layer of the selected region is different from a transparency of other region except the selected region on the screen of the mobile terminal; and the screen content corresponding to the layer of the selected region is determined as a final regional screen shot.

With the reception of the local region selected by the user of the mobile terminal, the finally captured regional screen shot matches with the region of user interest without error. Moreover, since difference in transparencies is used to distinguish the selected region from the non-selected region, it is helpful for the user to visually determine the selected region definitely, and it is convenient for the user to further adjust the region on this basis.

If an operating system installed on the mobile terminal of the user is an android system, the above processes can be accomplished using some libraries of functions (or methods) in the android system in practice. Specifically, the android system receives a TOUCH event on a rectangular box for indicating the selected region, and calls a scalegesturedetectoron function to detect a change of the rectangular box, and calls a smartisanscalelistener function which is a callback function to calculate the selected region where the rectangular box locates in the case that the rectangular box does not move; and the android system calls an invalidate ( ) function for a view to draw the layer of the selected region. The functionality is achieved by rewriting onDraw (Canvas) in ImageView based on a Smartisancutscreenshot class in the android system (the class is inherited from ImageView).

The two improvements described above may be used separately as embodiments to achieve the object of the disclosure, or may be combined as one embodiment to achieve the object of the disclosure. In the case that the two improvements are combined and the android system is used for the both, in order to ensure independency of service logics and reduce the coupling degree of the system, preferably, different functional modules are used for different capturing modes to implement the disclosure in a systemUI application. For example, two different services (standard components in the android system) are used, where one is used to accomplish the regional screen capturing operation, and the other is used to accomplish the full screen capturing operation.

It should be noted that, in the foregoing embodiments and various improved embodiments, the full screen capturing operation or the regional screen capturing operation is triggered directly once the relationship of the preset time threshold and the difference between the time stamps is determined. In some cases, it may not desirable for the user of the mobile terminal that the corresponding operation is triggered directly only by comparing the time of pressing the specified key, because the user can not accurately control the time of an pressing operation on the specified key and an error may occur. In the occurrence of the error, the automatic execution of the operation described above is inevitable. If the user wants to correct the error, the process in the disclosure is required to be restarted, which is very inconvenient. For this end, preferably, the relationship of the preset time threshold and the difference between the time stamps is used as the condition for triggering the control bar with a trigger point for full screen capturing function and a trigger point for regional screen capturing function in the disclosure. That is to say, in the case that the difference between the time stamps is less than or greater than the preset time threshold, the control bar with the trigger point for full screen capturing function and the trigger point for regional screen capturing function is presented on the screen of the mobile terminal. The corresponding function trigger point on the control bar is triggered by the user. The full screen capturing operation is triggered in the case that the trigger point for full screen capturing function is triggered; or the regional screen capturing operation is triggered in the case that the trigger point for regional screen capturing function is triggered. In such manner, not only the pressing operation on the specified key by the user of the mobile terminal is used, but also the selection of the user is honored sufficiently, thereby enhancing the user experience. Certainly, in practical application, the foregoing embodiments may be more preferable for the user of the mobile terminal, for the reason that the way of triggering control bar, in one aspect, encounters the delay of operation due to the waiting for the selection of the user and the reduced efficiency of the screen capturing operation, and in another aspect, introduces extra steps in connection with the selection operation of the user and therefore renders the screen capturing operation more complicated. The foregoing different implementations may be selected by the user of the mobile terminal as required.

Figure 3:
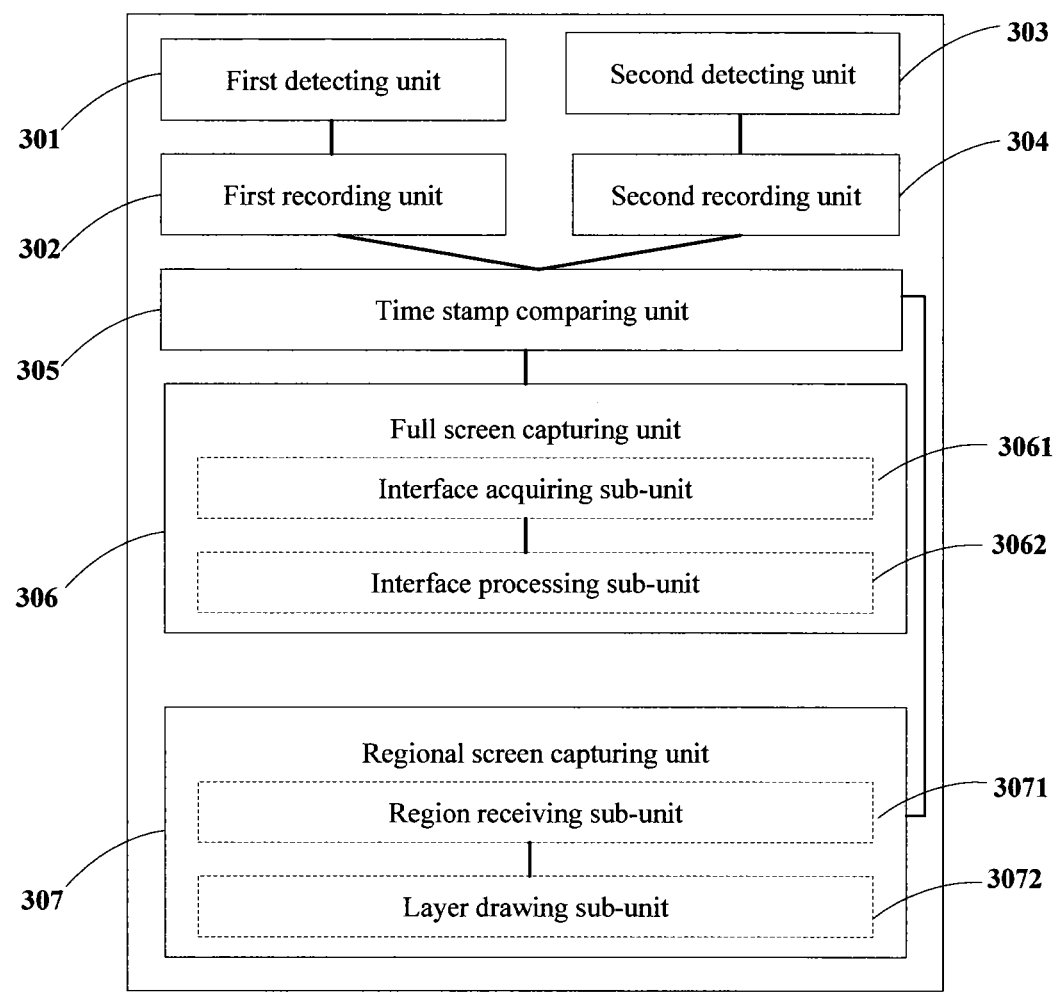
FIG. 3 is a structural block diagram of a device for capturing screen content of a mobile terminal according to an embodiment of the disclosure.

The method for capturing the screen content of the mobile terminal according to the disclosure is described in detail above, accordingly, a device embodiment for capturing screen content of a mobile terminal is further provided according to the disclosure. Reference is made to FIG. 3, which illustrates a structural block diagram of a device for capturing screen content of a mobile terminal according to the disclosure. The device includes: a first detecting unit 301, a first recording unit 302, a second detecting unit 303, a second recording unit 304, a time stamp comparing unit 305, and a full screen capturing unit 306 or a regional screen capturing unit 307.

The first detecting unit 301 is configured to detect a DOWN event of a specified key of the mobile terminal.

The first recording unit 302 is configured to record the time of occurrence of the DOWN event as a first time stamp when the occurrence of the DOWN event of the specified key of the mobile terminal is detected.

The second detecting unit 303 is configured to detect an UP event of the specified key of the mobile terminal.

The second recording unit 304 is configured to record the time of occurrence of the UP event as a second time stamp when the occurrence of the UP event of the specified key of the mobile terminal is detected.

The time stamp comparing unit 305 is configured to compare a difference between the second time stamp and the first time stamp with a preset time threshold, where the full screen capturing unit or the regional screen capturing unit is triggered in the case that the difference is less than the preset time threshold, or a regional screen capturing unit or a full screen capturing unit is triggered in the case that the difference is greater than the preset time threshold.

The full screen capturing unit 306 is configured to perform a full screen capturing operation on the screen content of the mobile terminal, and the full screen capturing operation is used to capture all of the screen content of the mobile terminal to obtain a full screen shot.

The regional screen capturing unit 307 is configured to perform a regional screen capturing operation on the screen content of the mobile terminal, and the regional screen capturing operation is used to capture a selected region of the screen content of the mobile terminal to obtain a regional screen shot.

The working process according to the device embodiment includes: the first detecting unit 301 detects a DOWN event of a specified key of the mobile terminal, and the time of occurrence of the DOWN event is recorded by the first recording unit 302 as a first time stamp when the occurrence of the DOWN event of the specified key of the mobile terminal is detected by the first detecting unit 301; the second detecting unit 303 detects an UP event of the specified key of the mobile terminal, and the time of occurrence of the UP event is recorded by the second recording unit 304 as a second time stamp when the occurrence of the UP event of the specified key of the mobile terminal is detected by the second detecting unit 303; and then a difference between the second time stamp and the first time stamp is compared by the time stamp comparing unit 305 with a preset time threshold; in the case that the difference is less than the preset time threshold, the full screen capturing unit 306 is triggered to perform a full screen capturing operation on the screen content of the mobile terminal or the regional screen capturing unit 307 is triggered to perform a regional screen capturing operation on the screen content of the mobile terminal; in the case that the difference is greater than the preset time threshold, the regional screen capturing unit 307 is triggered to perform a capturing operation on a selected region of the screen content of the mobile terminal to obtain a regional screen shot or the full screen capturing unit 306 is triggered to perform a capturing operation on all of the screen content of the mobile terminal to obtain a full screen shot.

According to the device embodiment, the DOWN event and UP event of the specified key are detected and the time of occurrence of the events is recorded, the difference between the time stamps for the specified key is determined, and then the full screen capturing operation or the regional screen capturing operation are performed on the screen content of the mobile terminal based on the relationship of the difference and the preset time threshold. As compared with the conventional technology, not only a screen shot can be obtained by performing a screen capturing operation on the screen content of the mobile terminal, but also different screen capturing modes (a full screen capturing and a regional screen capturing) can be switched by following preset configuration, so that the screen capturing operation meets the user's demands, thereby enhancing the user experience.

The full screen capturing unit 306 in the above device embodiment may have different inner constitutions based on different implementations. For example, the full screen capturing unit 306 may include: an interface acquiring sub-unit 3061 and an interface processing sub-unit 3062. The interface acquiring sub-unit 3061 may be configured to acquire a real-scale interface of a screen of the mobile terminal, where the real-scale interface refers to a maximum physical screen present by the mobile terminal; and the interface processing sub-unit 3062 may be configured to scale the real-scale interface down, and determine the scaled-down full screen shot containing the screen content of the mobile terminal as a final full screen shot. Similarly, the regional screen capturing unit 307 may include a region receiving sub-unit 3071 and a layer drawing sub-unit 3072. The region receiving sub-unit 3071 may be configured to receive the selected region in a local portion on a screen of the mobile terminal; and the layer drawing sub-unit 3072 may be configured to draw a layer of the selected region, where a transparency of the drawn layer of the selected region is different from a transparency of other region except the selected region on the screen of the mobile terminal, and to determine the screen content corresponding to the layer of the selected region as a final regional screen shot.

Furthermore, the above device may further include a control bar presenting unit, configured to present a control bar with a trigger point for full screen capturing function and a trigger point for regional screen capturing function on the screen of the mobile terminal in the case that the difference between the second time stamp and the first time stamp is less than or greater than the preset time threshold, so that the regional screen capturing unit performs the regional screen capturing operation or the full screen capturing unit performs the full screen capturing operation on the screen content of the mobile terminal according to the selection of the trigger point for full screen capturing function or the trigger point for regional screen capturing function on the control bar.

It should be noted that, for conciseness of description, the above embodiments in the specification and various variations of the embodiments are described with an emphasis placed on explaining the difference between respective embodiments or variations; hence, for the same or similar parts among the embodiments or variations, they can be referred to from one another. Particularly, several variations of the device embodiment are described simply since the device embodiment is similar basically to the method embodiment, and the relevant part may be referred to the description for the method embodiment. In the above, the units of the device embodiment may be or may be not separate in physical. The units may be located at a same place or may be distributed on multiple networks. In practical application, the object of the embodiment may be achieved by selecting a part or all of the units according to the practical needs, which can be understood and implemented by those skilled in the art without creative effort.

The forgoing descriptions are only the specific embodiments of the present disclosure, and it should be noted that numerous improvements and modifications made to the present disclosure can further be made by those skilled in the art without being departing from the principle of the present disclosure, and those improvements and modifications shall fall into the scope of protection of the disclosure.

What is claimed is:

1. A method for capturing screen content of a mobile terminal, comprising:

detecting a DOWN event of a specified key of the mobile terminal, and recording the time of occurrence of the DOWN event as a first time stamp when the occurrence of the DOWN event of the specified key of the mobile terminal is detected;

detecting an UP event of the specified key of the mobile terminal, and recording the time of occurrence of the UP event as a second time stamp when the occurrence of the UP event of the specified key of the mobile terminal is detected;

comparing a difference between the second time stamp and the first time stamp with a preset time threshold; and performing a full screen capturing operation on the screen content of the mobile terminal in the case that the difference is less than the preset time threshold, and performing a regional screen capturing operation on the screen content of the mobile terminal in the case that the difference is greater than the preset time threshold; or, performing the regional screen capturing operation on the screen content of the mobile terminal in the case that the difference is less than the preset time threshold, and performing the full screen capturing operation on the screen content of the mobile terminal in the case that the difference is greater than the preset time threshold, wherein the full screen capturing operation is used to capture all of the screen content of the mobile terminal to obtain a full screen shot, and the regional screen capturing operation is used to capture a selected region of the screen content of the mobile terminal to obtain a regional screen shot, wherein the performing the regional screen capturing operation on the screen content of the mobile terminal comprises receiving the selected region in a local portion on a screen of the mobile terminal, wherein the receiving the selected region in a local portion on a screen of the mobile terminal comprises: receiving a TOUCH event on a rectangular box for indicating the selected region on the screen to detect a change of the rectangular box, and in the case that the rectangular box does not move, calculating the selected region where the rectangular box is located.

2. The method according to claim 1, wherein the process of performing a full screen capturing operation on the screen content of the mobile terminal comprises:

acquiring a real-scale shot of an interface of a screen of the mobile terminal, wherein the real-scale shot of the interface refers to that the shot has the same size as a maximum physical screen present by the mobile terminal; and scaling the real-scale shot of the interface down and determining the scaled-down shot containing all of the screen content of the mobile terminal as a final full screen shot.

3. The method according to claim 2, wherein the process of acquiring a real-scale shot of an interface of a screen of the mobile terminal comprises acquiring a bitmap for the real-scale interface of the screen of the mobile terminal; and the process of scaling the real-scale shot of the interface down and determining the scaled-down shot containing all of the screen content of the mobile terminal as a final full screen shot comprises scaling the bitmap down and adding a view, which loads the scaled-down bitmap, into a current window, wherein the scaled-down bitmap presented in the window is the final full screen shot.

4. The method according to claim 3, wherein the full screen capturing operation performed on the screen content of the mobile terminal is accomplished by a first service component in a system UI application.

5. The method according to claim 1, wherein the process of performing a regional screen capturing operation on the screen content of the mobile terminal further comprises:

drawing a layer of the selected region, wherein a transparency of the drawn layer of the selected region is different from a transparency of a region except the selected region on the screen of the mobile terminal; and determining the screen content corresponding to the layer of the selected region as a final regional screen shot.

6. The method according to claim 5, wherein the process of drawing a layer of the selected region comprises calling a function for a view to draw the layer of the selected region.

7. The method according to claim 6, wherein the regional screen capturing operation performed on the screen content of the mobile terminal is accomplished by a service component in a system UI application.

8. The method according to claim 1, wherein the specified key of the mobile terminal is one real key or one function key of the mobile terminal, or a combination of two real keys, a combination of two function keys or a combination of one real key and one function key of the mobile terminal.

9. The method according to claim 8, wherein the combination of two real keys is a combination of a power key and a reset key.

10. A device for capturing screen content of a mobile terminal, comprising: a processor; and a memory storing program instructions, wherein when the program instructions are executed by the processor, the processor is configured to:

detect a DOWN event of a specified key of the mobile terminal;

record the time of occurrence of the DOWN event as a first time stamp when the occurrence of the DOWN event of the specified key of the mobile terminal is detected;

detect an UP event of the specified key of the mobile terminal;

record the time of occurrence of the UP event as a second time stamp when the occurrence of the UP event of the specified key of the mobile terminal is detected;

compare a difference between the second time stamp and the first time stamp with a preset time threshold; and perform a full screen capturing operation on the screen content of the mobile terminal in the case that the difference is less than the preset time threshold, and perform a regional screen capturing operation on the screen content of the mobile terminal in a case that the difference is greater than the preset time threshold; or, perform the regional screen capturing operation on the screen content of the mobile terminal in the case that the difference is less than the preset time threshold, and perform the full screen capturing operation on the screen content of the mobile terminal in the case that the difference is greater than the preset time threshold;

wherein the full screen capturing operation is used to capture all of the screen content of the mobile terminal to obtain a full screen shot, and the regional screen capturing operation is used to capture a selected region of the screen content of the mobile terminal to obtain a regional screen shot, wherein the performing the regional screen capturing operation on the screen content of the mobile terminal comprises receiving the selected region in a local portion on a screen of the mobile terminal, wherein the receiving the selected region in a local portion on a screen of the mobile terminal comprises: receiving a TOUCH event on a rectangular box for indicating the selected region on the screen to detect a change of the rectangular box, and in the case that the rectangular box does not move, calculating the selected region where the rectangular box is located.

11. The device according to claim 10, wherein the full screen capturing unit comprises an interface acquiring sub-unit and an interface processing sub-unit, wherein the interface acquiring sub-unit is configured to acquire a real-scale shot of an interface of a screen of the mobile terminal, wherein the real-scale shot of the interface refers to that the shot has the same size as a maximum physical screen present by the mobile terminal; and the interface processing sub-unit is configured to scale the real-scale shot of the interface down and determine the scaled-down shot containing all of the screen content of the mobile terminal as a final full screen shot.

12. The device according to claim 10, wherein the processor is further configured to:

draw a layer of the selected region, wherein a transparency of the drawn layer of the selected region is different from a transparency of a region except the selected region on the screen of the mobile terminal, and the screen content corresponding to the layer of the selected region is determined as a final regional screen shot.

* * * * *